United States Patent
Duong et al.

(10) Patent No.: US 10,415,391 B2
(45) Date of Patent: Sep. 17, 2019

(54) ROTOR AND GAS TURBINE ENGINE INCLUDING A ROTOR

(71) Applicant: UNITED TECHNOLOGIES CORPORATION, Farmington, CT (US)

(72) Inventors: Loc Quang Duong, San Diego, CA (US); Xiaolan Hu, San Diego, CA (US); Nagamany Thayalakhandan, San Diego, CA (US); Benjamin E. Fishler, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 145 days.

(21) Appl. No.: 14/702,051

(22) Filed: May 1, 2015

(65) Prior Publication Data
US 2015/0330225 A1    Nov. 19, 2015

Related U.S. Application Data

(60) Provisional application No. 61/993,842, filed on May 15, 2014.

(51) Int. Cl.
| | | |
|---|---|---|
| *F01D 5/02* | (2006.01) | |
| *F01D 5/10* | (2006.01) | |
| *F01D 5/04* | (2006.01) | |
| *F04D 29/28* | (2006.01) | |
| *F04D 29/68* | (2006.01) | |
| *F02C 7/12* | (2006.01) | |

(52) U.S. Cl.
CPC ............. *F01D 5/02* (2013.01); *F01D 5/04* (2013.01); *F01D 5/10* (2013.01); *F02C 7/12* (2013.01); *F04D 29/284* (2013.01); *F04D 29/681* (2013.01); *F05D 2250/73* (2013.01); *F05D 2260/60* (2013.01); *F05D 2260/961* (2013.01); *Y02T 50/675* (2013.01)

(58) Field of Classification Search
CPC ............. F01D 5/02; F01D 5/04; F01D 5/10
See application file for complete search history.

(56) References Cited

U.S. PATENT DOCUMENTS

| | | |
|---|---|---|
| 4,294,135 A | 10/1981 | Tameo |
| 4,926,710 A | 5/1990 | Novotny |
| 5,582,077 A | 12/1996 | Agram et al. |

(Continued)

FOREIGN PATENT DOCUMENTS

| | | | |
|---|---|---|---|
| DE | 30 26 558 A1 | 1/1982 | |
| DE | 3026558 A1 * | 1/1982 | ............... F01D 5/04 |

(Continued)

OTHER PUBLICATIONS

European Search Report for Application No. 15 16 6116; dated Dec. 1, 2015.
English Translation to DE3026558 Abstract.

*Primary Examiner* — Richard A Edgar
*Assistant Examiner* — Michael L Sehn
(74) *Attorney, Agent, or Firm* — Cantor Colburn LLP (57) ABSTRACT

The present disclosure relates generally a gas turbine engine and a rotor therefor. The rotor may include a symmetric rim thereon to prevent the propagation of induced vibratory responses. The rim may have one or more sloping surfaces to prevent the re-attachment of boundary layer flow.

17 Claims, 8 Drawing Sheets

(56) References Cited

U.S. PATENT DOCUMENTS

| | | | | |
|---|---|---|---|---|
| 6,588,298 B2 * | 7/2003 | Czerniak | ............... | F01D 5/027 416/145 |
| 7,296,976 B2 * | 11/2007 | Roever | ............... | F01D 5/027 416/144 |
| 7,377,749 B2 * | 5/2008 | Charrier | ............... | F01D 5/027 416/119 |
| 8,025,483 B2 * | 9/2011 | Blanchard | ............... | F01D 5/027 416/144 |
| 8,328,519 B2 | 12/2012 | Denis et al. | | |
| 8,668,451 B2 | 3/2014 | Juh | | |
| 2006/0083619 A1 | 4/2006 | Roever et al. | | |
| 2013/0209260 A1 | 8/2013 | Stone | | |

FOREIGN PATENT DOCUMENTS

| | | |
|---|---|---|
| EP | 1 243 811 A2 | 9/2002 |
| EP | 2447472 A2 | 5/2012 |
| GB | 2 287 510 A | 9/1995 |

* cited by examiner

ROTOR AND GAS TURBINE ENGINE INCLUDING A ROTOR

CROSS REFERENCE TO RELATED APPLICATION

This application claims the benefit of and incorporates by reference herein the disclosure of U.S. Ser. No. 61/993,842, filed May 15, 2014.

TECHNICAL FIELD OF THE DISCLOSURE

The present disclosure relates generally to a gas turbine engine, and more specifically to a rotor for a gas turbine engine.

BACKGROUND OF THE DISCLOSURE

In a gas turbine engine, there are many structures which can act as vibratory excitation sources, imparting unwanted vibration excitation to adjacent structures. Depending on the frequency of the resulting vibratory response and its amplitude, material fatigue and even failure can occur. This is particularly true for rotors that rotate within the engine.

Furthermore, some rotary mechanisms (rotors) are designed to direct a portion of the gas path to a secondary air system within the engine that is designed to prevent hot gas ingestion and to cool parts of the engine. If the air flow around the rotor is not adequately directed, insufficient pressurized air flow will be delivered to the secondary air system.

SUMMARY OF THE DISCLOSURE

In one embodiment, a rotor defining an axis of rotation is disclosed, the rotor comprising: a forward side; an aft side; and an asymmetric rim disposed on the aft side.

In a further embodiment of the above, the asymmetric rim is non-cyclical.

In a further embodiment of the above, the rotor comprises an impeller within a gas turbine engine.

In a further embodiment of any of the above, the asymmetric rim comprises a balancing rim.

In a further embodiment of any of the above, the asymmetric rim comprises: a first segment including a first radially outer edge disposed at a first radius, a first radially inner edge disposed at a second radius; and a second segment including a second radially outer edge disposed at a third radius, a second radially inner edge disposed at a fourth radius; wherein the first radius is different than the third radius and the second radius is different than the fourth radius.

In a further embodiment of any of the above, further comprising: a third segment including a third radially outer edge disposed at a fifth radius and a third radially inner edge disposed at a sixth radius.

In a further embodiment of any of the above, the asymmetric rim comprises: a first segment having a first thickness and a first center of gravity disposed at a first radius; a second segment having a second thickness and a second center of gravity disposed at the first radius; wherein the first thickness is different than the second thickness.

In a further embodiment of any of the above, the first segment includes a first thickness at the first radially outer edge that is greater than a second thickness at the first radially inner edge; and the second segment includes a third thickness at the second radially outer edge that is greater than a fourth thickness at the first radially inner edge.

In a further embodiment of any of the above, the first and second segments each include a surface including a forward edge and an aft edge, wherein the forward edge is disposed at a larger radius than the aft edge.

In a further embodiment of any of the above, a surface of the aft side radially outward of the asymmetric rim is disposed at an angle to a plane perpendicular to the axis of rotation such that a radially inner edge of the surface is forward of a radially outer edge of the surface.

In a further embodiment of any of the above, the angle comprises an angle between approximately one degree and approximately five degrees.

In another embodiment, an assembly for a gas turbine engine is disclosed, the assembly comprising: an engine component; and a rotor defining an axis of rotation and disposed in the component, the rotor comprising: a forward side; an aft side; and an asymmetric rim disposed on the aft side; wherein the component comprises one of a compressor section, a combustion section, a turbine section, and an exhaust section.

In a further embodiment of the above, the asymmetric rim is non-cyclical.

In a further embodiment of the above, the rotor comprises an impeller within a gas turbine engine.

In a further embodiment of any of the above, the asymmetric rim comprises a balancing rim.

In a further embodiment of any of the above, the asymmetric rim comprises: a first segment including a first radially outer edge disposed at a first radius, a first radially inner edge disposed at a second radius; and a second segment including a second radially outer edge disposed at a third radius, a second radially inner edge disposed at a fourth radius; wherein the first radius is different than the third radius and the second radius is different than the fourth radius.

In a further embodiment of any of the above, the asymmetric rim comprises: a first segment having a first thickness and a first center of gravity disposed at a first radius; a second segment having a second thickness and a second center of gravity disposed at the first radius; wherein the first thickness is different than the second thickness.

In a further embodiment of any of the above, the first segment includes a first thickness at the first radially outer edge that is greater than a second thickness at the first radially inner edge; and the second segment includes a third thickness at the second radially outer edge that is greater than a fourth thickness at the first radially inner edge.

In a further embodiment of any of the above, the first and second segments each include a surface including a forward edge and an aft edge, wherein the forward edge is disposed at a larger radius than the aft edge.

In a further embodiment of any of the above, a surface of the aft side radially outward of the asymmetric rim is disposed at an angle to a plane perpendicular to the axis of rotation such that a radially inner edge of the surface is forward of a radially outer edge of the surface.

In a further embodiment of any of the above, the angle comprises an angle between approximately one degree and approximately five degrees.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to certain embodiments and specific language will be used to describe the same. It will nevertheless be understood that no limitation of the scope of the present disclosure is thereby intended, and alterations and modifications in the illustrated device, and further applications of the principles of the present disclosure as illustrated therein are herein contemplated as would normally occur to one skilled in the art to which the present disclosure relates.

Figure 1:
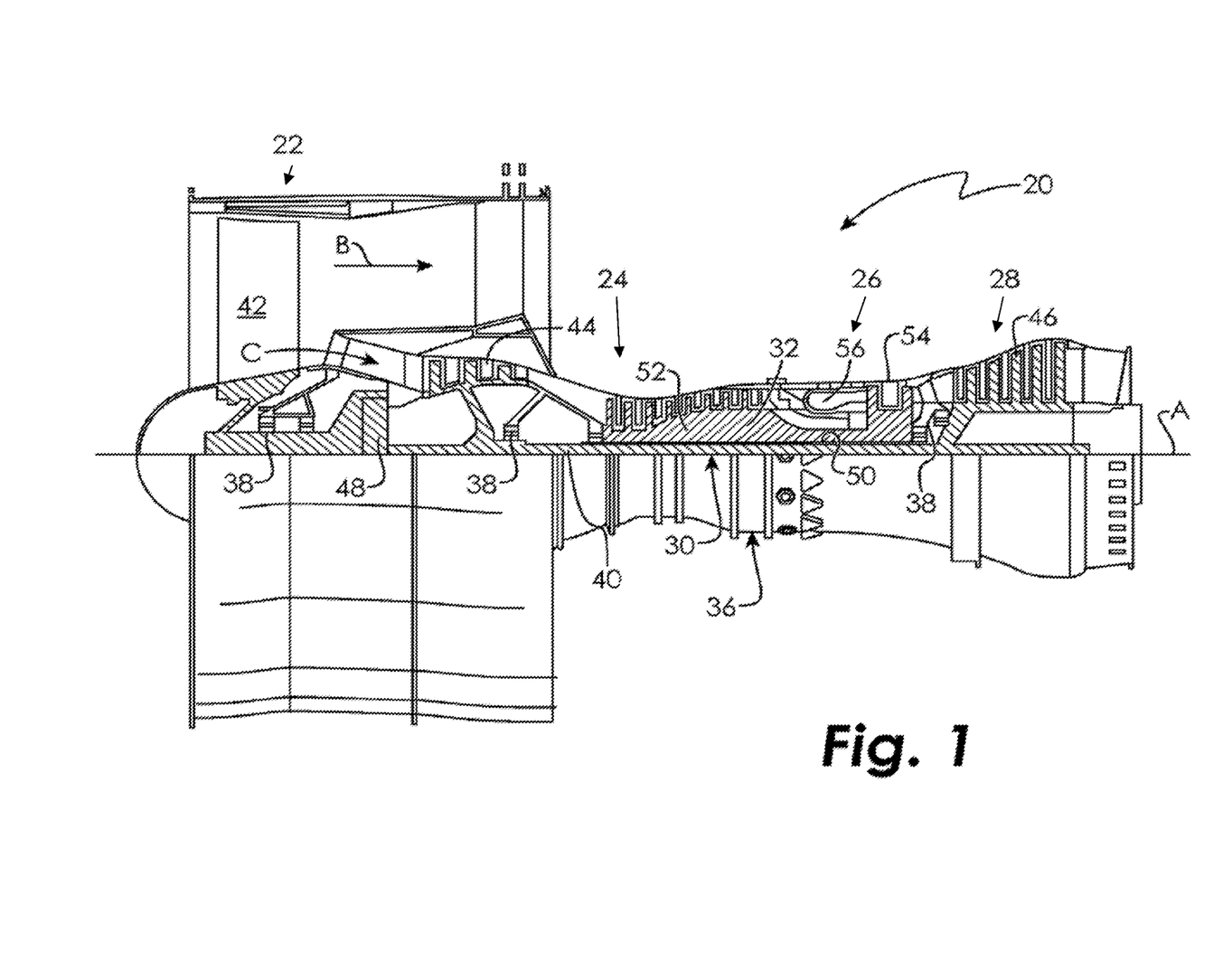
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2A:
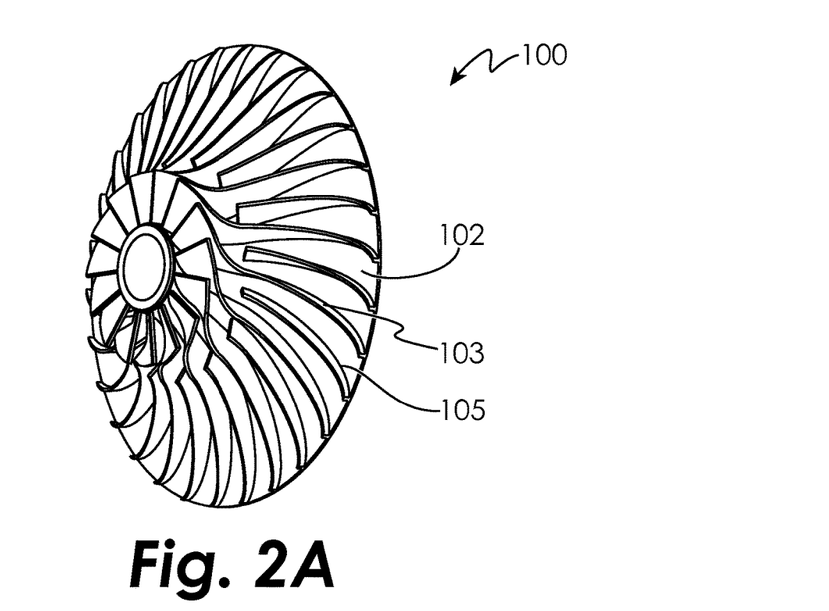
FIG. 2A is a schematic perspective first side view of a rotor in an embodiment.

Smaller gas turbines often employ a centrifugal or radial compressor, due to its inherent space efficiency. A rotor component of a radial compressor is a compressor impeller with a series of main blades and splitter blades, an example of which is shown in FIG. 2A and indicated generally at 100. The compressor impeller 100 comprises a disc 102 carrying main blades 103 and splitter blades 105 that compress incoming air, which is directed through a diffuser to a combustion chamber, mixed with fuel and ignited. The turbine is propelled by rapidly expanding gases resulting from the combustion of the fuel and the compressed incoming air. The impeller can also be solely used to deliver compressed air to the aircraft cabin. The compressor impeller 100 is linked to, and powered by the turbine.

During operation of the gas turbine engine, the main blades 103 and splitter blades 105 coupled with the disc 102 (i.e., the blade-disc system) can be subject to vibratory excitation at frequencies which coincide with integer multiples (referred to as harmonics) of the radial compressor's rotational frequency. As a result of this vibratory excitation, the main blades 103, the splitter blades 105 and/or the disc 102 can undergo vibratory deflections that create vibratory stress on the blades 103/105. If the vibratory excitation occurs in an expected operating speed range of the radial compressor, the vibratory stresses can create high cycle fatigue of the impeller 100.

Manufacture of the impeller 100 commonly results in small random variations in blade profile and blade properties of the radial compressor blades 103/105. However, within a tight manufacturing tolerance control, a bladed disc like the impeller 100 is considered as a cyclically symmetric structure, consisting of a basic sector which possesses rotational symmetry. That is, the overall configuration, consisting of n cyclic sectors, is obtained after the basic sector is rotated about the axis of symmetry n times by a given angle defined as (360/n) degrees.

The mechanical coupling between the disc 102 and blades 103/105 results in a complex coupled vibratory system, bearing dynamic characteristics of both blade and disc, and represents a combination of disc and blade oscillation at certain frequencies, called natural frequencies. The corresponding deflection modal-shape of the blade-disc system is characterized in terms of nodal diameter. A nodal diameter is a boundary line across the disc 102 diameter. The disc 102 structure lying on this line is stationary, while the rest of the structure vibrates in one direction on one side of this diametral line and in the opposite direction on the other side of the line.

Figure 2B:
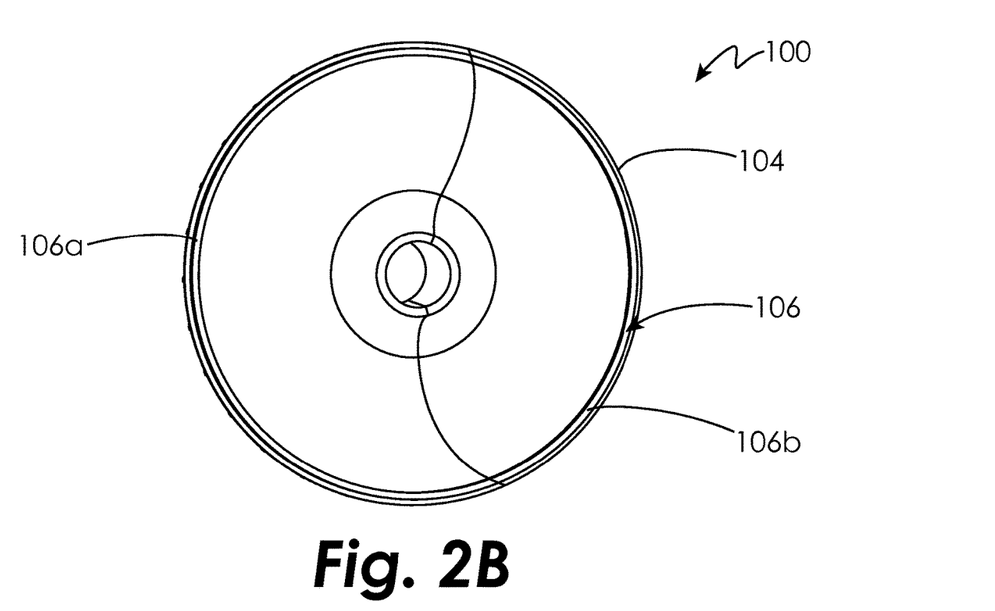
FIG. 2B is a schematic second side view of the rotor of FIG. 2A in an embodiment.
Figure 2C:
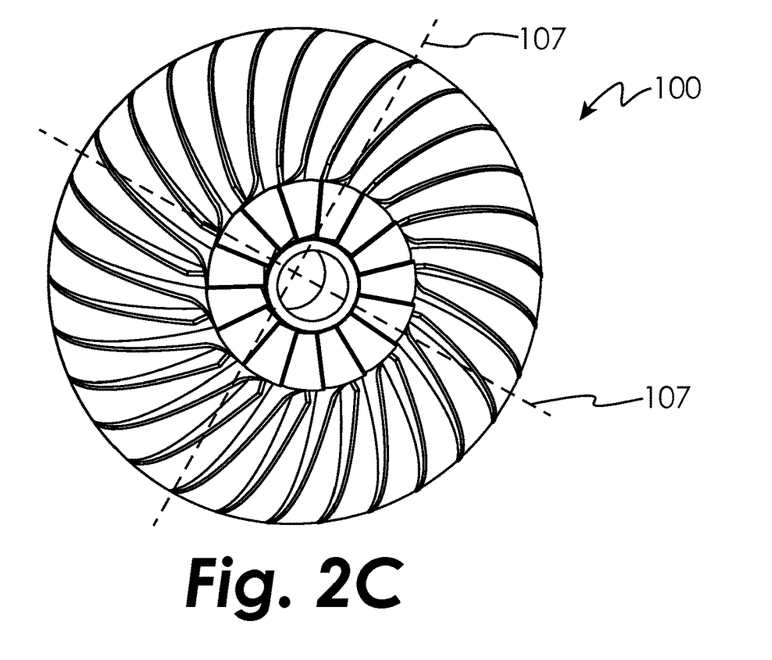
FIG. 2C is a schematic diagram illustrating two nodal diameters of a cyclically symmetric rotor in an embodiment.

FIG. 2C illustrates an example of a two nodal diameter coupling vibration of a cyclically symmetric impeller 100. The nodal lines 107 represent portions of the impeller 100 where there is no structural oscillation. Structural vibrations of opposite direction are located on the two sides of these nodal lines 107 (i.e., un-shaded areas). On a cyclically symmetric impeller, the two nodal lines 107 are normal to each other (i.e., they are at 90 degrees apart).

In terms of forced response, the blade-disc coupling structure is subjected to engine order excitation. An N engine order (NE), where N is an integer, is defined as N times the engine operational speed of the engine. The resonance of the vibration of the blade-disc coupling structure, such as that of an impeller 100, occurs when its natural frequencies are equal to the exciting frequencies of N engine order.

Engine vibration can result from forces generated by the rotation of an unbalanced rotor. Thus balancing the rotor components minimizes these engine vibration forces. Typically, the balancing of a rotating component is performed through material removal. In the case of the radial compressor, a balancing rim of sufficient mass for balancing is added to the back (aft) face of the impeller 100. During assembly of the engine, the rotational balance of the impeller 100 is tested and material is removed from the balancing rim at locations that will result in the impeller 100 being balanced while rotating.

The stiffness of the balancing rim affects the overall stiffness of the blade-disc system and thus its eigenvalue system (i.e., its natural frequency). In order to reduce the amplitude of vibration of the coupling modes (i.e. nodal diameters) of a rotary mechanism (rotor) such as a radial compressor, one or more asymmetric rims may be added thereto in accordance with the present disclosure. The asymmetry of the rim in terms of mass and stiffness is used to mis-tune the blade-disc system to generate modal distortion to diminish the impact of harmonic engine order vibratory excitation of the blade-disc system. An exemplary rotor 100 is schematically illustrated in FIGS. 2A-B, with a first side 102 shown in FIG. 2A and a second side 104 shown in FIG. 2B. The exemplary rotor is illustrated as an impeller 100; however, it will be appreciated from the present disclosure that the presently disclosed concepts will find application with other types of rotors. In the exemplary impeller 100, the first side 102 carries a plurality of main blades 103 and splitter blades 105 thereon. A nodal diameter results from the cyclic symmetry of the impeller 100. Therefore, by rendering the impeller 100 asymmetric, the propagation of the excitation wave across the rotor is diminished through creation of a distorted modal shape.

The impeller 100 therefore includes an asymmetric (non-cyclically symmetric) rim 106 on the second (aft) side 104. In some embodiments, the asymmetrical rim 106 is non-cyclical. In some embodiments, the asymmetric rim 106 is used as a balancing rim, where material may be removed from the rim 106 in select areas in order to rotationally balance the impeller 100. The asymmetric rim 106, consisting of two or more different segments 106a and 106b which have different inner and outer radii and different axial thicknesses (i.e., in an axial direction parallel to the axis of rotation of the rotor 100) in comparison to one another will negate the rotational symmetry of the impeller 100. Each segment 106a/106b has a different natural frequency, therefore the nodal pattern in each segment is mistuned against the other segment, preventing any response to a harmonic excitation source from being sustained and propagating across the impeller 100.

Figure 2D:
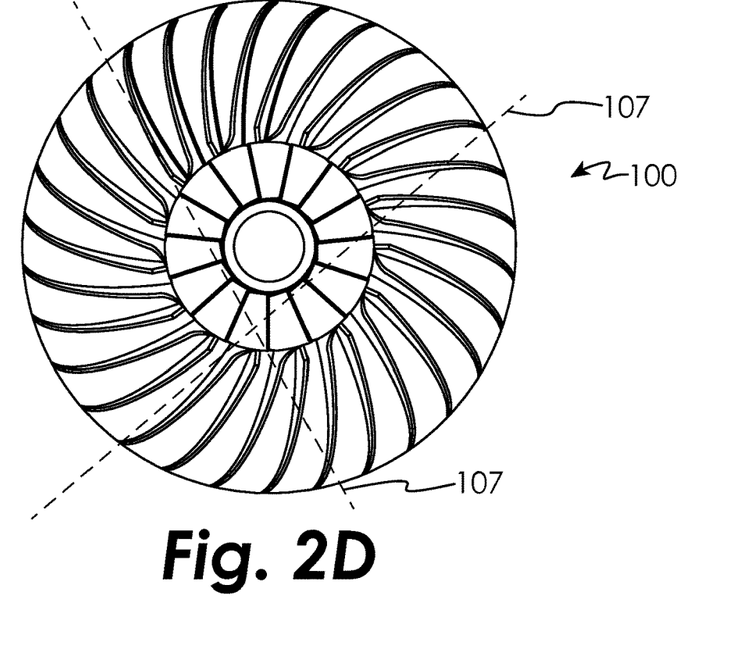
FIG. 2D is a schematic diagram illustrating two nodal diameters of an asymmetric rotor in an embodiment.
Figure 3:
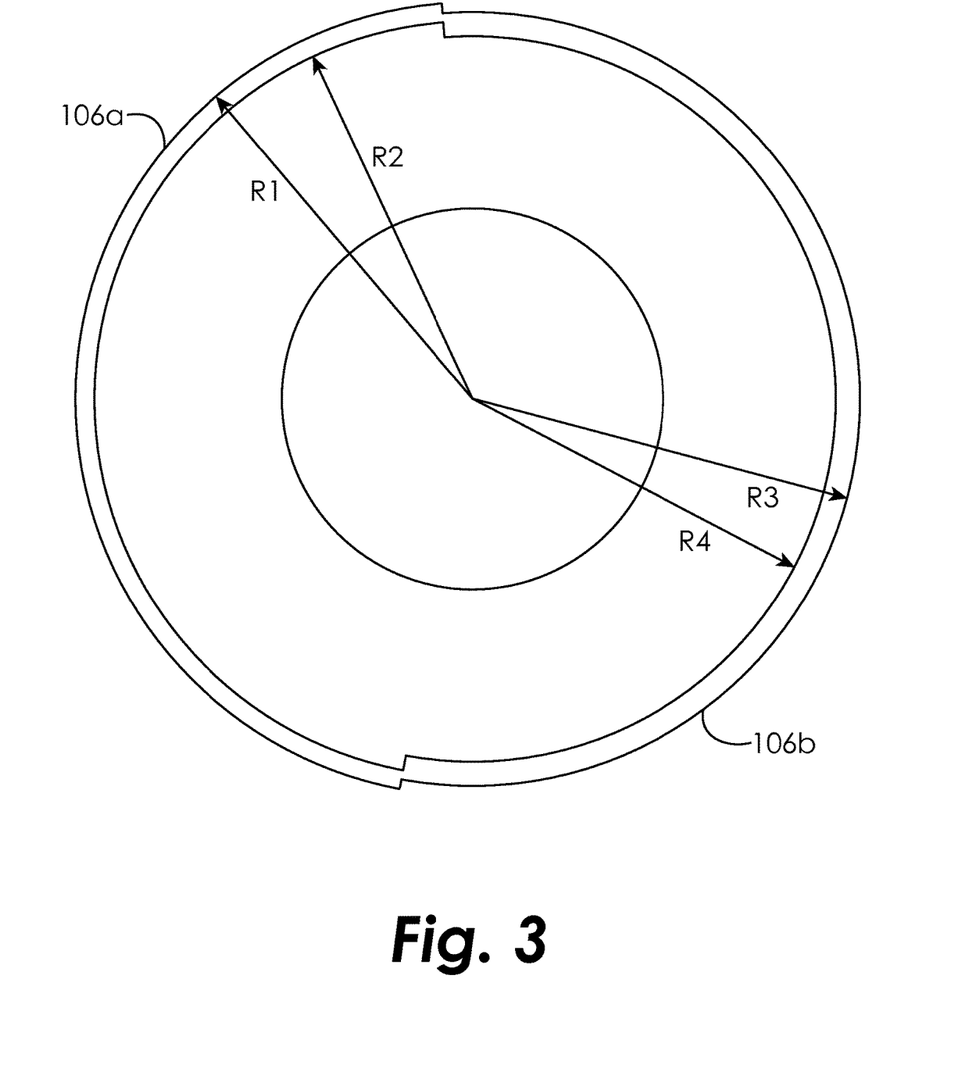
FIG. 3 is a schematic plan view of a rotor rim in an embodiment.
Figure 4:
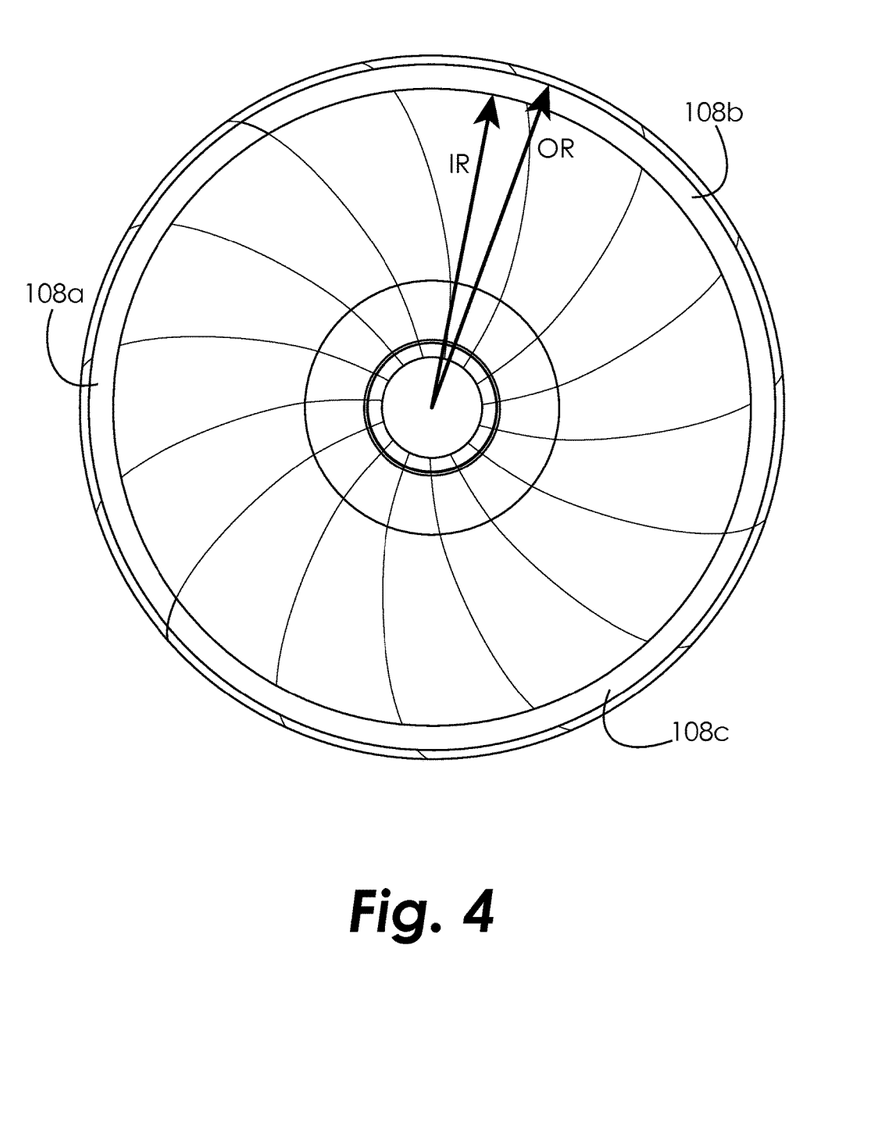
FIG. 4 is a schematic plan view of a rotor in an embodiment.

As shown schematically in FIG. 3, the segment 106a has an outside radius R1 and an inside radius R2, while the segment 106b has an outside radius R3 and an inside radius R4, with R1≠R3 and R2≠R4. Additionally, the axial thicknesses of segments 106a and 106b are different, but are chosen such that the center of gravity of each segment lies on a circle of a given radius. If the asymmetric rim 106 is used as a balancing rim, removal of material therefrom to rotationally balance the rotor will further increase the asymmetry of the segments 106a and 106b and will therefore further enhance the asymmetric effect on frequency mistuning and thus enhance blade-disc modal distortion. FIG. 2D illustrates the modal distortion resulting from the provision of the asymmetric rim 106, where the two nodal lines 107 are no longer normal to one another, thus diminishing the impact of harmonic engine order vibratory excitation. As shown in FIG. 4, there may be more than two segments, such as the segments 108a, 108b and 108c.

Figure 5:
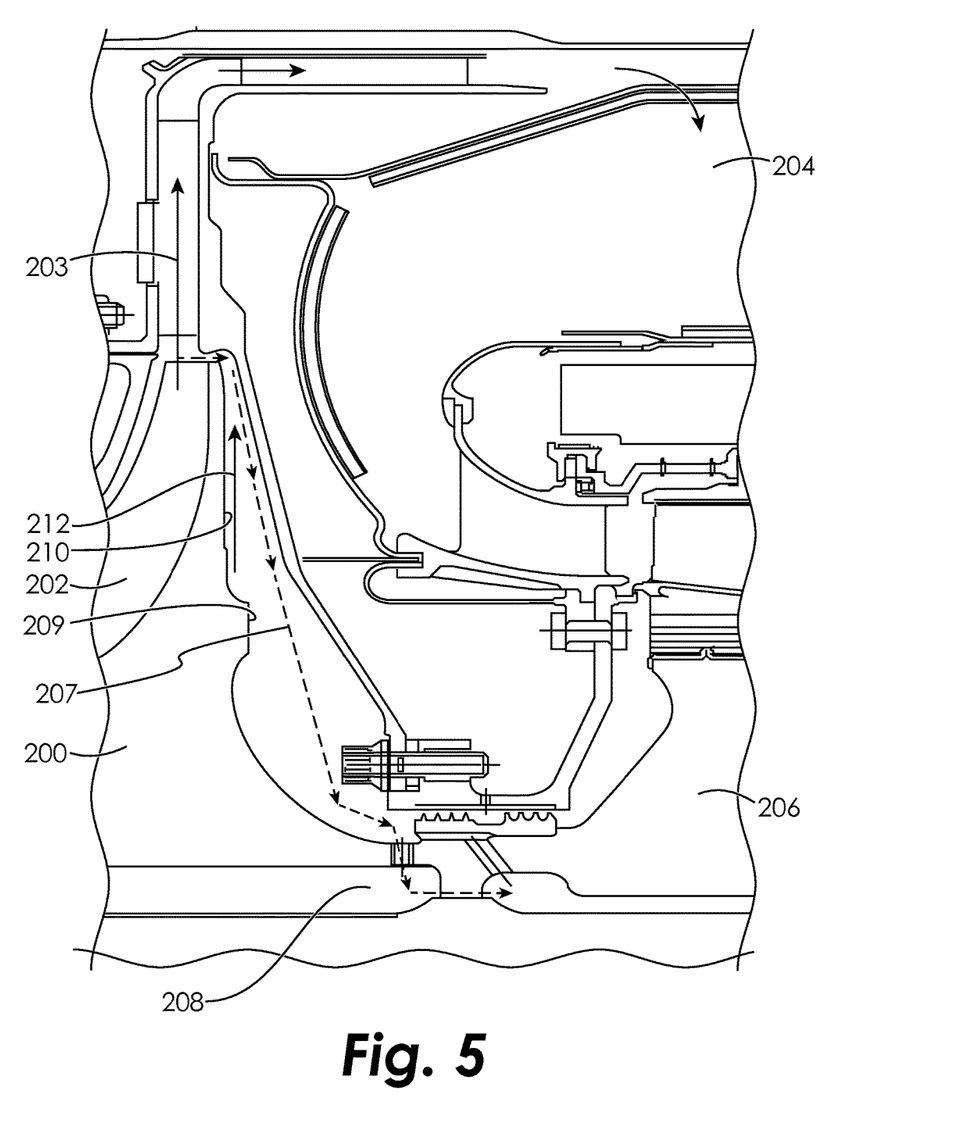
FIG. 5 is a schematic cross-sectional view of a portion of a gas turbine engine in an embodiment.

Referring now to FIG. 5, there is shown an exemplary embodiment of a rotor 200. The rotor 200 in the exemplary embodiment comprises an impeller having a plurality of impeller blades 202 on a forward surface thereof which direct gases in the gas path of the engine along a path 203 to a combustor section 204 where the gases are combusted with fuel. The exhaust gases from the combustor 204 flow to a turbine section 206. Some of the gases flowing past the impeller 200 follow a path 207 aft of the impeller 200 and enter a secondary air system 208 within the engine that is designed to prevent hot gas ingestion and to cool parts of the engine.

As the impeller 200 rotates, a boundary layer can develop on the aft side 210. The centrifugal forces resulting from shear between the aft side 210 and the gases aft of the impeller 200 can cause a boundary layer radial outflow 212 that interacts with the gases following the path 207. It will be appreciated that preventing or reducing this interaction by breaking down the boundary layer 212 will improve performance of the secondary air system 208. A known balancing rim 209 is illustrated on the impeller 200.

Figure 6A:
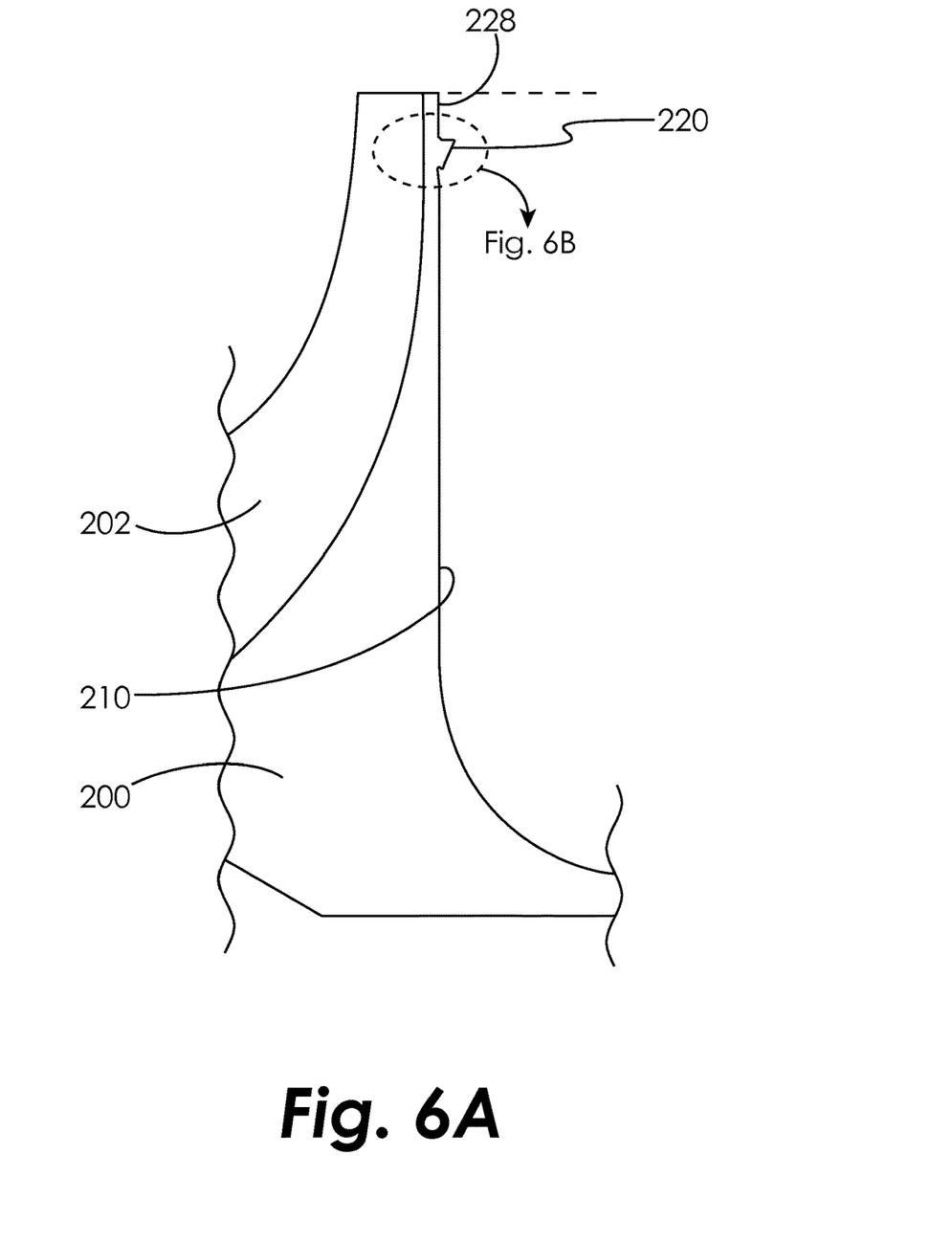
FIGS. 6A-B are schematic plan views of a rotor in an embodiment.
Figure 6B:
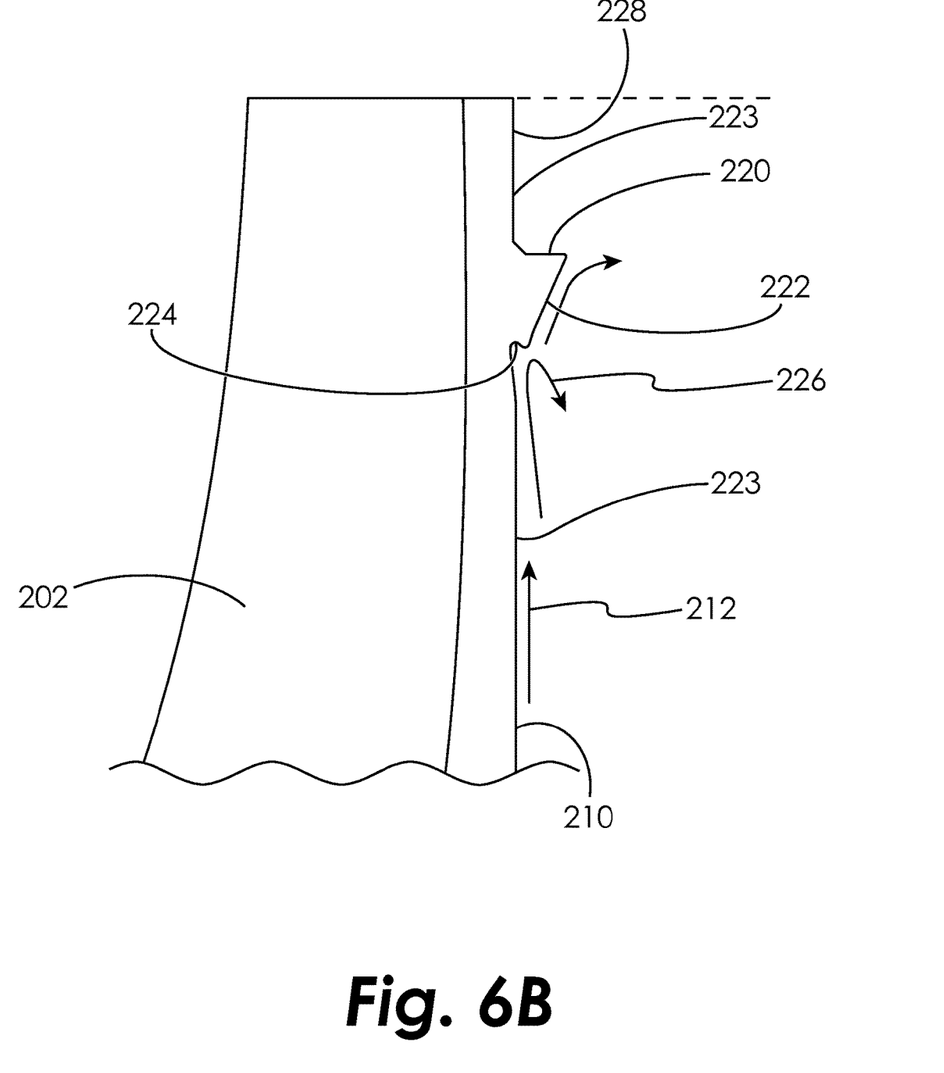

As shown in FIGS. 6A-B, the impeller 200 may be modified to include a rim 220 on the aft side 212. The rim 220 may be provided in addition to the balancing rim 209, or the rim 220 may be used as a balancing rim (from which material may be removed during an operation to rotationally balance the rotor) and the balancing rim 209 may be eliminated. It will be appreciated that in some embodiments, the rim 220 may be formed in two or more segments as discussed above with respect to the asymmetric rim 106.

The rim 220 includes an outward sloping surface 222 tilted in the aft direction, i.e., an axial thickness of the rim 220 at its radially outer edge is greater than an axial thickness of the rim 220 at its radially inner edge. The sloping surface 222 moves the boundary layer away from a main surface 223 of the impeller 200 and helps to prevent re-attachment of the boundary layer with the main surface 223 past the balancing rim 222 radially outer edge. In addition, the radially inner surface of the balancing rim 222 may comprise a sloping surface 224 tilted radially inward, i.e., the sloping surface 224 is disposed at a larger radius at its forward edge than at its aft edge. The sloping surface 224 will redirect the entrained mass flow inside the boundary layer 212 radially inward along the path 226 and further helps to prevent re-attachment of the boundary layer past the balancing rim 222 radially outer edge. Finally, another sloping surface 228 sloping in the aft direction may be provided, i.e., the radially inner edge of sloping surface 228 is forward of the radially outer edge of sloping surface 228. In one embodiment, the sloping surface 228 forms an angle between approximately 1 degree and approximately five degrees with a plane perpendicular to the axis of rotation of the impeller 200. The sloping surface 228 further helps to prevent re-attachment of the boundary layer past the balancing rim 222 radially outer edge.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A rotor defining an axis of rotation, the rotor comprising:
    a forwardmost side;
    an aftmost side; and
    an asymmetric rim extending axially from the aftmost side, the asymmetric rim a balancing rim formed integral to the aftmost side, the asymmetric rim asymmetric about the axis of rotation;
    wherein a surface of the aftmost side radially outward of the asymmetric rim is disposed at an angle to a plane perpendicular to the axis of rotation such that the surface slopes aftward with increasing radial distance from the axis of rotation.

2. The rotor of claim 1, wherein the asymmetric rim is non-cyclical.

3. The rotor of claim 1, wherein the rotor comprises an impeller within a gas turbine engine.

4. The rotor of claim 1, wherein the asymmetric rim comprises:
    a first segment including a first radially outer edge disposed at a first radius, a first radially inner edge disposed at a second radius; and
    a second segment including a second radially outer edge disposed at a third radius, a second radially inner edge disposed at a fourth radius;
    wherein the first radius is different from the third radius and the second radius is different from the fourth radius.

5. The rotor of claim 4, further comprising:
    a third segment including a third radially outer edge disposed at a fifth radius and a third radially inner edge disposed at a sixth radius.

6. The rotor of claim 4, wherein:
    the first segment includes a first axial thickness at the first radially outer edge that is greater than a second axial thickness at the first radially inner edge; and
    the second segment includes a third axial thickness at the second radially outer edge that is greater than a fourth axial thickness at the first radially inner edge.

7. The rotor of claim 4, wherein the first and second segments each include a surface including a forward edge and an aft edge, wherein the forward edge is disposed at a larger radius than the aft edge.

8. The rotor of claim 1, wherein the asymmetric rim comprises:
    a first segment having a first axial thickness and a first center of gravity disposed at a first radius;
    a second segment having a second axial thickness and a second center of gravity disposed at the first radius;
    wherein the first axial thickness is different from the second axial thickness.

9. The rotor of claim 1, wherein the angle comprises an angle between approximately one degree and approximately five degrees.

10. An assembly for a gas turbine engine, the assembly comprising:
    an engine component; and
    a rotor defining an axis of rotation and disposed in the component, the rotor comprising:
        a forwardmost side;
        an aftmost side; and
        an asymmetric rim extending axially from the aftmost side, the asymmetric rim a balancing rim formed integral to the aftmost side, the asymmetric rim asymmetric about the axis of rotation;
    wherein the component comprises one of a compressor section, a combustion section, a turbine section and an exhaust section;
    wherein a surface of the aftmost side radially outward of the asymmetric rim is disposed at an angle to a plane perpendicular to the axis of rotation such that the surface slopes aftward with increasing radial distance from the axis of rotation.

11. The assembly of claim 10, wherein the asymmetric rim is non-cyclical.

12. The assembly of claim 10, wherein the rotor comprises an impeller within a gas turbine engine.

13. The assembly of claim 10, wherein the asymmetric rim comprises:
   a first segment including a first radially outer edge disposed at a first radius, a first radially inner edge disposed at a second radius; and
   a second segment including a second radially outer edge disposed at a third radius, a second radially inner edge disposed at a fourth radius;
   wherein the first radius is different from the third radius and the second radius is different from the fourth radius.

14. The assembly of claim 13, wherein:
   the first segment includes a first axial thickness at the first radially outer edge that is greater than a second axial thickness at the first radially inner edge; and
   the second segment includes a third axial thickness at the second radially outer edge that is greater than a fourth axial thickness at the first radially inner edge.

15. The assembly of claim 13, wherein the first and second segments each include a surface including a forward edge and an aft edge, wherein the forward edge is disposed at a larger radius than the aft edge.

16. The assembly of claim 10, wherein the asymmetric rim comprises:
   a first segment having a first axial thickness and a first center of gravity disposed at a first radius;
   a second segment having a second axial thickness and a second center of gravity disposed at the first radius;
   wherein the first axial thickness is different from the second axial thickness.

17. The assembly of claim 10, wherein the angle comprises an angle between approximately one degree and approximately five degrees.

* * * * *